March 17, 1970　　AKINOBU MATSUDA　　3,500,700
VARIABLE RATIO POWER STEERING GEAR
Filed May 28, 1968　　　　　　　　　　3 Sheets-Sheet 1

Inventor
AKINOBU MATSUDA
By
Mason, Fenwick & Lawrence
Attorneys

Inventor
AKINOBU MATSUDA
By
Mason, Fenwick & Lawrence
Attorneys

United States Patent Office 3,500,700
Patented Mar. 17, 1970

3,500,700
VARIABLE RATIO POWER STEERING GEAR
Akinobu Matsuda, Osaka, Japan, assignor to Koyo Seiko Company, Limited, Osaka, Japan
Filed May 28, 1968, Ser. No. 732,770
Claims priority, application Japan, June 3, 1967, 42/35,634
Int. Cl. B62d 1/20
U.S. Cl. 74—498
3 Claims

ABSTRACT OF THE DISCLOSURE

An improved power steering gear which is adapted to transmit steering force from a steering column to front wheels in order to decrease the amount of steering wheel rotation or save time in such a case as when garaging an automobile during low speed running and to keep steering wheel operation stable during high speed running, too.

The improvement in a power steering gear includes a special profile sector so as to make variable the gear ratio between the sector and the rack in proportion to the rotation of steering wheels in the left or right direction from the neutral position.

---

This invention relates to improvements in a power steering gear and particularly to improvements in a variable ratio power steering gear in which a rack having teeth on a reference pitch line parallel to the axis of a worm shaft meshes with a sector having a tapered tooth gear of an improved special profile formed thereon and the gear ratio of the sector is successively varied in conjunction with the meshing between the two in proportion to the rotation of the sector from the neutral position toward the right or left direction in accordance with the movement of said rack.

In the operation of an automobile it has been, in general, necessary to decrease resistance due to steering operation while the steering wheel is sharply rotated during low speed running, to save time or trouble for turning a street corner by decreasing steering wheel rotation and to keep steering wheel operation stable during high speed running.

As a vehicle gets larger, the conventional manual ball screw steering mechanism without auxiliary power means makes the operator tired, because resistance due to steering wheel rotation is larger since the gear ratio of the conventional steering mechanism is relatively small.

Such disadvantage in the conventional manual steering is considerably overcome by the appearance of the power steering arrangement. That is, the power steering mechanism is adapted to easily rotate the steering wheel by slight force without the gear ratio thereof, if it is extremely small or large, since the rotation of the steering wheel is operated by the aid of hydraulic pressure. Accordingly, the power steering arrangement works to the utmost in case of much rotation of the steering wheel to garage a vehicle, and so the operator hardly feels resistance from steering wheel rotation.

But when the gear ratio in the power steering mechanism is small, there is a fear of bringing steering wheel operation in very dangerous condition, because the front dirigible wheels are sensitively turned by a slight rotation of the steering wheel owing to an accident or carelessness of the operator while straightly running. Recently such danger has been increased by a vehicle being operated at higher speed. On the other hand, if the steering gear ratio is large, the rotation of the steering wheel is smooth without any resistance, according to a characteristic of the power steering.

It is not enough, however, to save the operator's trouble in steering operation particularly in case of rotating the steering wheel to sharply turn a vehicle, because the operator has to rotate the steering wheel five or six times to rotate the dirigible wheel from an extreme lock position to the other extreme lock position.

As described above, the decrease of resistance due to the steering wheel that is desired for operating a vehicle has been achieved by the power steering arrangement. It is impossible, however, only for the power steering arrangement to settle the problems of reducing time for turning a vehicle and achieving stability in the steering wheel in straightly running.

On the other hand, there is known a steering mechanism including a sector which is meshed with a rack and is adapted to be rotated by the longitudinal movement of the rack and to vary the gear ratio between the neutral position and the opposite position of the sector to overcome the problems as described above, for example in the U.S. Patent No. 2,159,225, "Variable Ratio Power Steering," to Lincoln, of Sept. 27, 1960. The variable ratio power steering gear disclosed in the U.S. patent uses specially profiled gears which comprise a rack having teeth on an arched pitch line and a sector meshed with the rack which has three teeth, the central one being formed as long lever arm and the opposites being short.

A primary object of this invention is to provide a power steering gear in which, when a rack setting a straight line parallel to the axis of a worm shaft as a reference pitch line and having teeth formed on the reference pitch line meshes with a sector having a tapered tooth gear of special profile, the sector thus meshed is moved either in the right or the left direction from the neutral position, and the gear ratio in said meshing is successively varied in proportion to an increase in the angle of rotation of the sector.

Another object of this invention is to reduce time and effort during maneuvering and parking a vehicle in close quarters in such a construction in which the rack is shifted in an axial direction by the rotation of a worm shaft and the gear ratio in the meshing of the sector with the rack is successively decreased in proportion to an increase in the angle of rotation of the sector in the right or left direction from the neutral position.

Still another object of this invention is to improve stability in the operation of the steering wheel during high-speed driving on a straight course by making the gear ratio in the neutral position of the meshing between the sector and the rack larger than that in the other positions.

A still further object of this invention is to make a sector bring its function into maximum play as a variable ratio power steering gear by forming into a special tooth profile only the teeth of the sector that meshes with a rack used in the conventional power steering, namely a rack setting a straight line parallel to the axis of a worm shaft as a reference pitch line and having a reference tooth profile of equal pitch and pressure angle formed on the reference pitch line.

Yet another object of this invention is to make it possible to improve a variable ratio power steering gear without making drastic changes in the component parts of the power steering gear in conventional use except for changing only the sector thereof for a sector having a special tooth profile and formed according to this invention, thereby greatly improving a handle feel in the steering of a vehicle during driving.

The objects described above can be attained by improvements in the tooth profile of the sector according to this invention and also in the pressure angle of a rack. The characteristics of this invention will become apparent from the following description made with reference to an embodiment of the invention to be described hereinafter in the specification and shown in the accompanying drawings in which.

A power steering gear assembly of ball circulation type has been applied to automobiles of various types and its detailed structure is well-known in the art and accordingly only a brief reference will be made to the structure and its related parts in the description to be made hereinafter.

Figure 1:
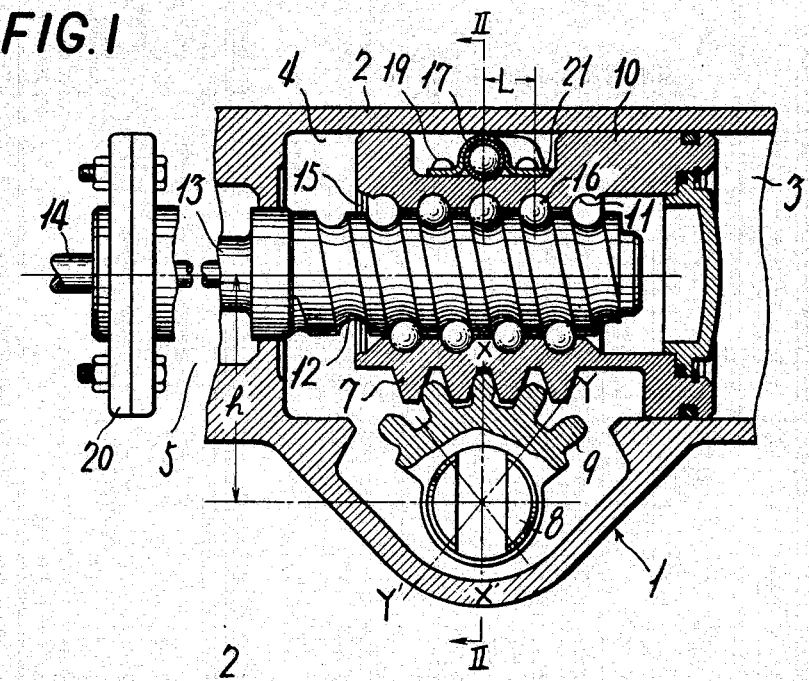
FIG. 1 is a view of the power steering gear according to this invention, shown, longitudinally sectionally in part, along the axis of a worm shaft.

Referring to the drawings and in particular to FIG. 1, the numeral 2 denotes a power cylinder which is formed within a housing 1 receiving a steering gear assembly and confines a reciprocating piston 10 forming working chambers 3 and 4.

The piston 10 has an axial bore 15 with an internal helical groove 11 formed therein.

The numeral 13 denotes a worm shaft whose one end having a helical groove 12 is inserted into said bore 15 of the piston 10 and whose other end is operably connected to the lower end of a steering shaft 14 by a flexible coupling 20 so as to be rotated by the movement transmitted through the flexible coupling 20 as the steering shaft 14 is manually rotated by the steering wheel (not shown) secured to its upper end. The valve (not shown) is disposed within an extended portion 5 of said cylinder so as to cause the worm shaft 13 and the steering shaft 14 to be smoothly rotated by the aid of hydraulic pressure and is actuated by the rotation transmitted through the flexible coupling 20 as the steering shaft 14 is rotated. The valve and working chambers 3 and 4 communicate with fluid through the conduits (not shown) and the flow of fluid between the valve and the working chambers 3 and 4 is regulated by the actuation of said valve.

The piston 10 and the worm shaft 13 are operably interconnected by means of a plurality of balls 16 disposed between the internal helical groove 11 and the helical groove 12 to be capable of circulating within a transfer tube 17 secured on the piston 10 by lock bolts 19 and a clamp 21. The worm shaft 13 is rotated by the rotation transmitted through the flexible coupling 20 secured to the steering shaft 14 under the aid of hydraulic pressure of the valve as the steering shaft 14 is rotated and then the piston 10 fitted over the worm shaft 13 is moved in an axial direction by the circulation of a plurality of balls 16 between the internal helical groove 11 and the helical groove 12 as the worm shaft 13 is rotated.

The lower part of the piston 10 has a reference pitch line formed on the straight line parallel to the worm shaft 13 and a rack 7 having teeth formed on the reference pitch line. The teeth of the rack 7 are shown in the form of a standard tooth form of equal pitch and pressure angle in the embodiment.

Figure 2:
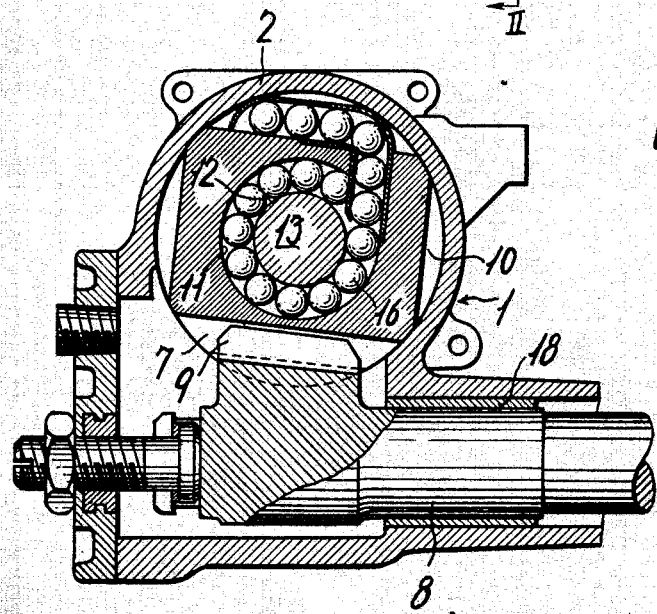
FIG. 2 is a section on the line II—II in FIG. 1.

The rack 7 as shown in FIG. 2 is inclined at a suitable angle with respect to the axial direction of the cross shaft 8 to be described hereinafter.

This inclining is determined depending upon the angle of a taper formed in a tapered shape with respect to the axial direction of the cross shaft 8 of a sector 9 formed integrally with the cross shaft 8. Inside the housing 1 rotatably bearing the foremost end of the worm shaft 13 is held rotatably the cross shaft 8 disposed at a right angle with the worm shaft 13 and the sector 9 formed integrally with the cross shaft 8 with the rack 7 of said construction having the standard tooth profile formed on the piston 10.

The base of the cross shaft 8 is carried rotatably by a bearing sleeve 18 shown provided in the housing 1 or other suitable means, and the foremost end (not shown) is carried on the housing 1 by the same means as the above, said foremost end being connected to the steering mechanism related with the dirigible wheels (not shown). As is generally known, the turning force applied to the steering wheel is anti-frictionally changed into the axial movement of the piston 10 by a plurality of balls 16 interposed so as to be circulated between the helical groove 12 of the worm shaft 13 and the internal helical groove 11 of the piston 10, and the axial movement of the piston 10 in turn brings the rack 7 into meshing with the sector 9, and is changed into the rightward or leftward rotation in FIG. 1 of the cross shaft 8 and transmitted from the cross shaft 8 through the steering mechanism to the dirigible wheels.

It is contemplated by this invention to introduce a variable ratio power steering gear into the mechanism described above by forming the tooth profile of the sector 9 into a special profile. The important thing in determining the tooth profile of the sector 9 is that the distance $h$ (see FIG. 1) between the centers of the rack 7 and the sector 9 remains unchanged at any moment of the axial movement of the rack 7 and the rightward or leftward rotation in FIG. 1 of the sector 9 meshing with the rack 7, because the reference pitch line of the rack 7 is a straight line parallel to the axis of the worm shaft 13, and the center of rotation of the sector 9 is always positioned on the axis of the cross shaft 8. The meshing of the rack 7 with the sector 9 must be such that it is always carried out smoothly at any moment of change effected in the angle of rotation of the sector 9 in proportion to the axial movement of the rack 7. If the meshing should lack smoothness, the driver will have a very disagreeable feel of roughness or irregularity in the operation of the steering wheel.

Figure 3:
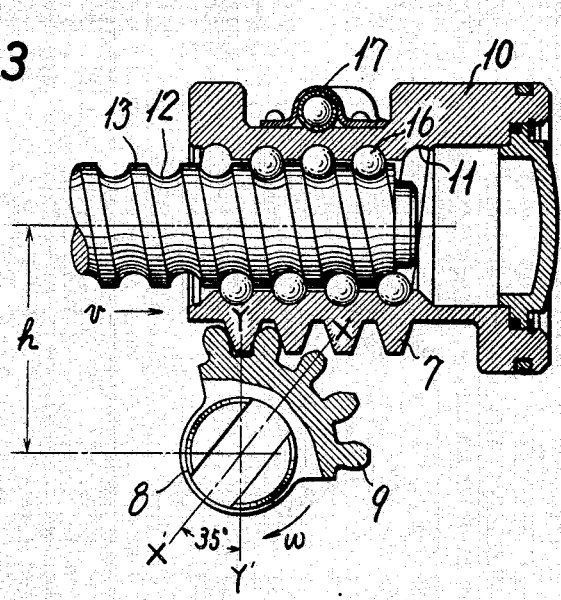
FIG. 3 is a view illustrative of the operation of the steering in which view the rack and the sector are shown shifted in the right direction from the position they took in FIG. 1.

Under the restriction described above, this invention is so constructed as to vary successively the gear ratio between the rack 7 and the sector 9 in proportion to the change made in the angle of rotation of the sector 9 in accordance with the movement of the rack 7. As the operation of this invention is schematically shown in FIG. 3, when the distance $h$ (between the centers of the rack 7 and the sector 9) is held always definite and the rack 7 is moved at constant speed, the sector 9 increases in its angle of rotation in the right and left directions from the neutral position X-X', and in accordance with the increase in the angle of rotation, the sector 9 becomes higher in its angular velocity ω.

Generally, the gear ratio $i$ in the power steering gear assembly of a ball circulation type is given by a formula:

$$i = \frac{\pi M Z}{L} \quad (1)$$

wherein L represents the pitch of the internal helical groove 11 and the helical groove 12 that circulate the balls 16 therein; M, a module; and Z, the number of the teeth of the sector 9 (in which the number of the teeth means the number in the case where the sector is supposed not as a sector gear but as a completely circular gear). The teeth of the rack 7 are of equal pitch and pressure angle and formed on the reference pitch line made up of a straight line, and furthermore the distance $h$ between the centers of the rack 7 and the sector 9 is invariable, and accordingly when it is desired to vary the gear ratio $i$ in the foregoing Formula 1, the number of the teeth Z is used as a variable, since L and M are constant. And as described, the gear ratio in the meshing of the sector 9 with the rack 7 is successively decreased in proportion to the rotation of the sector 9 meshing with the rack 7 from the neutral position (X-X' in FIG. 1) toward either the right or the left direction in accordance with the movement of the rack 7 so that the sector 9 becomes higher in its angular velocity ω in accordance with the increase in the angle of rotation of the steering wheel.

Accordingly, the tooth profiles on the circumference of the sector 9 are formed in the manner that the number of the teeth Z may successively decrease in proportion as a line of teeth shifts to the left or right direction from the line X-X' indicating the neutral position of the sector 9 in FIG. 1.

Figure 4:
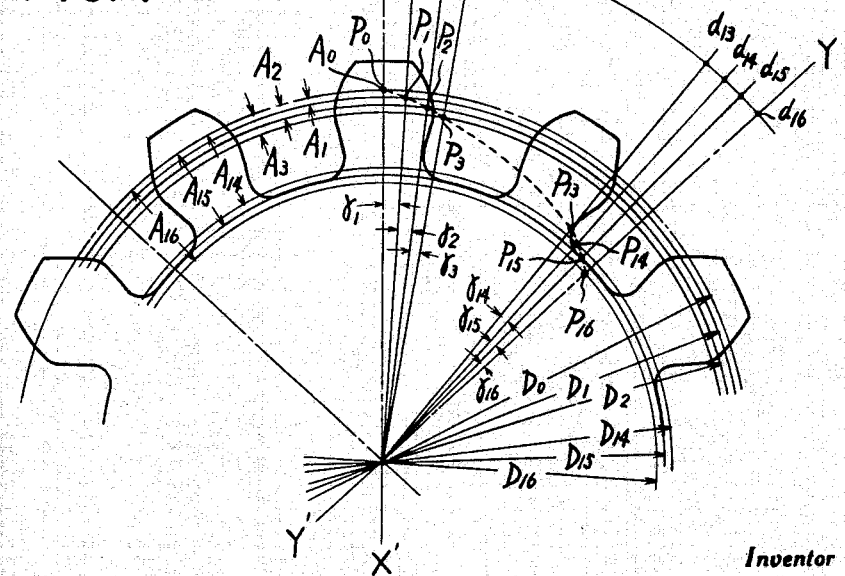
FIG. 4 is a diagram illustrative of an example that determines a special tooth profile of the section according to this invention.

That is to say, the tooth profiles of the sector 9 shown in FIGS. 1, 3 and 4 are formed so that the number of the teeth Z is largest ($Z_{max}$) on the line X-X' and smallest ($Z_{min}$) on the line Y-Y' and that accordingly the number of the teeth Z formed between the lines X-X' and Y-Y' successively decreases from $X_{max}$ to $Z_{min}$ in proportion to the progress of division lines $d_0$ (X-X'), $d_1$, $d_2$ ... $d_{16}$ (Y-Y') in FIG. 4 covering the distance between the lines X-X' and Y-Y' from $d_0$ to $d_{16}$.

This relation is numerically illustrated by way of example as follows:

If $Z_{max}=16.5$ teeth and $Z_{min}=14$ teeth, the number of the teeth Z of the sector 9 positioned in the aforementioned division lines $d_0$ (X-X'), $d_1$, $d_2$ ... $d_{16}$ (Y-Y') is designed in structure to decrease successively in such a manner as $Zd_0=Z_{max}=16.5$ teeth, $Zd_1=16.34375$ teeth, $Zd_2=16.18750$ teeth ... $Zd_{16}=Z_{min}=14$ teeth. Thus, the fact that the teeth formed in one sector 9 are designed to decrease in number according as the teeth are shifted in position from the right to the left direction from the position X-X' naturally brings about a change in the pitch. But since the reference pitch line of the rack 7 is a straight line and the tooth profiles of the rack 7 are of equal pitch and pressure angle, it will be impossible for the rack 7 and the sector 9 to mesh with each other except in the neutral position on the line X-X', if the pitch of the sector 9 is changed simply in proportion to a decrease in the number of the teeth. And since the module M of the rack 7 is prevented from being changed, the module M of the sector 9 also must be made equal to that of the rack 7. As described above, since the number of the teeth Z of the sector 9 is $Z_{max}$ in the neutral position on the line X-X' and decreases successively up to $Z_{min}$ in proportion as the teeth are shifted in position either to the right or to the left direction from the neutral position, and the change in the module M of the sector 9 is prevented, the sector 9 must be of the construction which makes it possible not only to decrease the number of the teeth Z but also to successively decrease a pitch circle diameter P.C.D. that becomes a reference of forming tooth profiles and further to obtain the smooth meshing of the sector 9 with the rack.

The concept described above makes it possible to develop an ideal tooth profile that serves the aforementioned purposes by introducing a theory of profile shifted gears. That is to say, the pitch circle diameter P.C.D. is determined by the formula:

$$P.C.D. = Z \times M \quad (2)$$

wherein since M is a constant and Z, a variable, the pitch circle diameters that correspond to each of the aforesaid $d_0$ (X-X'), $d_1$, $d_2$ ... $d_{16}$ (Y-Y') is largest in the position X-X' and smallest in the position Y-Y', decreasing successively in the range from X-X' to Y-Y'. And an angle of shift that corresponded to a change in the P.C.D. is given by the formula:

$$r = \frac{360° \times P}{Z \times R} \quad (3)$$

wherein P represents a pitch between the positions X-X' and Y-Y' of the sector 9 and R, a division ratio obtained by the division of said pitch by the division lines $d_0$, $d_1$, $d_2$ ... $d_{16}$. That is to say, if connection is made of intersection points $P_0$, $P_1$, $P_2$ ... $P_{16}$ of the pitch circle diameters $D_0$, $D_1$, $D_2$ ... $D_{16}$, which are obtained by dividing suitably the distance between the positions X-X' and Y-Y' of the sector 9 and calculating the number of the teeth, pitch circle diameters and angles of shift in the divided positions by use of the foregoing Formulas 1, 2 and 3 with the division lines $d_0$ (X-X'), $d_1$, $d_2$ ... $d_{16}$ (Y-Y') determined by the angle of shift 0°, $r_1$, $r_2$ ... $r_{16}$ corresponding to said pitch circle diameters $D_0$, $D_1$, $D_2$ ... $D_{16}$, a continued curve will be obtained in which curve the amount of shift at said intersection points becomes successively larger in the order of $A_1$, $A_2$ ... $A_{16}$ from $A_0$ shown as zero in the amount of shift in FIG. 4 until finally the amount of shift at the intersection point $P_{16}$ in the pitch circle diameter P.C.D. of $Z_{min}$ becomes maximum as shown in FIG. 4. The coefficient of shift that can thus successively decrease the gear ratio between the positions X-X' and Y-Y' is given by said curves $P_0$, $P_1$, $P_2$ ... $P_{16}$ and the special tooth profile of the sector 9 can be determined by the change in the curve.

The tooth profile determined by the theory described above is shown as an example in FIG. 4. The sector 9 shown in FIGS. 1, 3 and 4 indicates that the pitch of the sector 9 which varies the gear ratio in the meshing of the sector with the rack 7 is 1.5 pitch both in the right and left directions from the position X-X' of the sector 9, and the tooth profiles (those at both right and left ends in the figures) positoned further leftward or rightward show the construction in which the gear ratio in the position Y-Y' is held constant. As the meshing of the rack 7 with the sector 9 is illustrated by way of example in FIGS. 1 and 3, the rack 7 and the sector 9 are brought into smooth meshing with each other at any position of the angle of rottion of the sector 9, and the gear ratio in said meshing is shown smaller in FIG. 3 than in FIG. 1.

An example of calculation to be made in the production of a sector will be shown below with reference to an embodiment of this invention. Suppose that the angle of rotation of the sector 9 in the area ranging from the neutral position X-X' of the sector 9 in which position the gear ratio falls to a maximum value to the position Y-Y' in which the gear ratio shows a minimum value is set at 35°, the pitch L of the helical groove 12 is 8.466, the modules M of rack and sector each are 3.5, the gear ratio $i_{max}$ in the position X-X' is 21.4, the gear ratio $i_{min}$ in the position Y-Y' is 18.18, and the gear ratio $i$ is successively decreased from the position X-X' to the position Y-Y'.

The number of the teeth Z can be obtained from Formula 1 which follows:

$$Z_{max} = \frac{21.4 \times 8.466}{\pi \times 3.5} = 16.5$$

$$Z_{min} = \frac{18.18 \times 8.466}{\pi \times 3.5} = 14$$

$$\therefore Z_{max} - Z_{min} = 16.5 - 14 = 2.5$$

Then, if said difference in the number of the teeth, i.e. 2.5, were divided into 16 equal parts and the number of the teeth were decreased successively from $Z_{max}$ in the neutral position X–X' to $Z_{min}$ in the position Y–Y', the difference in the number of the teeth on the division lines $d_0, d_1, d_2 \ldots d_{16}$ (Y–Y') would amount to $2.5/16 = 0.15625$, and said pitch circle diameters $D_0, D_1, D_2 \ldots D_{16}$ corresponding to the number of the teeth on each division line would be as follows, through Formula 2:

$D_0 = 16.5 \times 3.5 = 57.75$ mm.
$D_1 = 16.34375 \times 3.5 = 57.203125$ mm.
$D_2 = 16.1875 \times 3.5 = 56.65625$ mm.
.
.
.
$D_{16} = 14 \times 3.5 = 49$ mm.

Furthermore, when the pitch P in the area ranging from the position X–X' to the position Y–Y' of the sector 9 is 1.5, the division ratio R (the number of the division lines from $d_0$ (X–X'), $d_1, d_2 \ldots d_{16}$ (Y–Y')) becomes 16, and hence the angles of shift corresponding to said pitch circle diameters can be obtained from Formula 3:

$$r_1 = \frac{360° \times 15}{16.34375 \times 16} \doteq 2.06°$$

$$r_2 = \frac{360° \times 1.5}{16.1875 \times 16} \doteq 2.09°$$

$$r_{16} = \frac{360° \times 1.5}{14 \times 16} \doteq 2.41°$$

Figure 5:
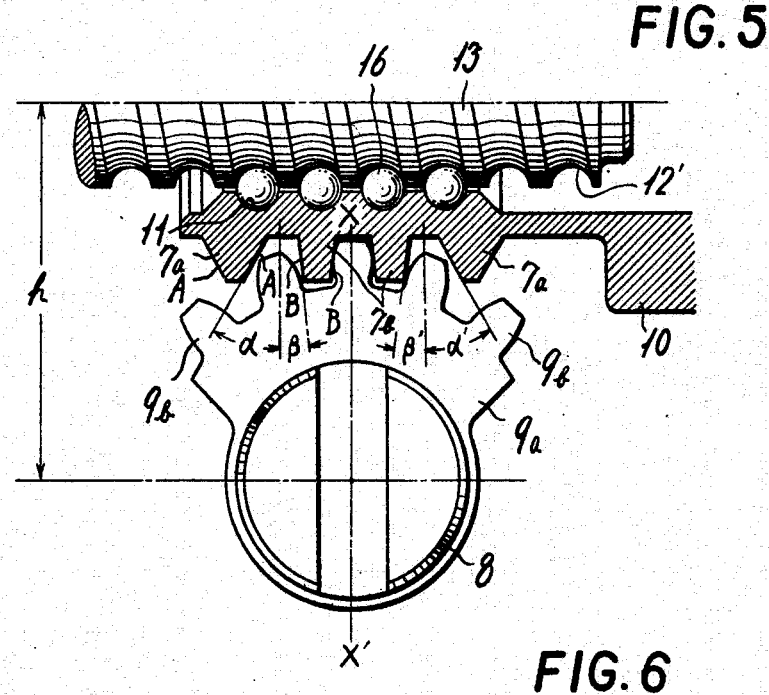
FIG. 5 is a view showing the state in which the rack meshes with the sector of this invention by improving the pressure angle of the rack.

FIG. 5 shows a modification of the tooth profile of this invention in which the pressure angles $\alpha$ and $\beta$ of the flanks A and B of the tooth profile of a rack 7a of equal pitch are changed symmetrically to the right and left sides from the neutral position in which the rack 7a meshes with a sector 9a. In said construction, the pressure angle $\alpha$ of the flank A is larger than the pressure angle $\beta$ of the flank B, as, for instance, $\alpha = 30°$, $\beta = 22°$.

When the gear ratio $i_{min}$ in the position Y–Y' where the rack 7a meshes with the sector 9a is extremely small, the number of the teeth of the sector 9a in the position Y–Y' (i.e. the opposite ends of the sector 9a) is small and the amount of shift, large, the root of the rack 7a interferes with that of teeth 9b, and so that thickness of the teeth 9b on the effective root circle is small, thereby causing irregular undercut. Thus, the thickness of the opposite teeth 9b of the sector 9a grows smaller and results in a decrease in the strength of the teeth. Accordingly, the tooth profiles of the rack 7a are constructed so as to be symmetrical on the right and left sides from the neutral position X–X' indicative of the neutral position in which the rack 7a and the sector 9a mesh with each other. The dedendum of the teeth 9b on the opposite ends of the sector 9a can be increased in thickness and improved in strength by forming the tooth profiles of the rack 7a into the construction described above. Therefore, it can be constructed to increase the thickness of the root of the teeth 9b in the opposite position Y–Y' of the sector 9a meshed with the rack 7a in such a way that the pressure angles of the two teeth 7b of the rack 7a of which the flanks are in meshing contact with the central tooth of the sector 9a in the neutral position X–X' can be equal to each other and the pressure angle of the flanks of the other teeth larger than that of the teeth 7b.

Figure 6:
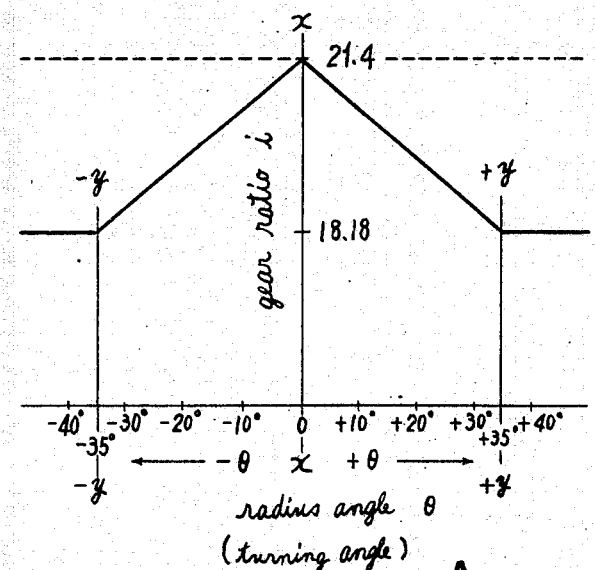
FIG. 6 is a diagram showing by comparison the working characteristics of the power steering gear of this invention and the conventional power steering gear.

If the gear ratio $i$ of the variable ratio power steering gear is taken as an axis of ordinate and the angle of rotation $\theta (\theta = \gamma)$ as an axis of abscissa (in which a minus sign — and a plus sign + are added to the leftward and rightward rotations of the sector respectively), the gear ratio varies successively from the gear ratio 21.4 in the neutral position X–X' of the steering gear as shown in a solid line in FIG. 6 (which means a position in which the position X–X' of the sector intersects at a right angle with the axis of the worm shaft and the dirigible wheels properly face toward the front) to the gear ratio 18.18 in the position $\pm Y - \pm Y'$ in which the sector is rotated through 35° to the right or left.

The characteristics of the variable ratio power steering mechanism of this invention will be apparent by comparison with those of the power steering gear of a conventional type (shown in a broken line).

It is to be understood that the characteristic curve shown in FIG. 6 is only one embodiment of this invention illustrative of the example of calculation described above, and the form of said characteristic curve can be freely changed by the modification of the details of the structure of the invention without departing from the scope and spirit of the invention.

As described above, this invention provides a system which makes it possible not only to smoothly mesh the section having teeth of a special profile formed thereon with the rack having a straight line parallel to the axis of the worm shaft fixed as a reference pitch line and having the tooth profiles formed on said reference line, but also to decrease successively the gear ratio of the steering gear in proportion as the angle of rotation of the steering wheel increases from the neutral position, attain improvement in stability and feel in the operation of the steering wheel during high-speed driving, and reduces the number of steering wheel turns, time and effort to maneuver a vehicle into a parking space.

What is claimed is:
1. In a variable ratio power steering gear comprising a housing having hydraulic control means and a cylinder supplied with hydraulic pressure through a valve unit of said hydraulic control means, a piston adapted to be reciprocated by the hydraulic pressure in the axial direction within said cylinder and having a helical groove inside and a tightly sealed bore at one end, a worm inserted into the bore of said piston so as to allow said piston to move in the axial direction and provided in the outer circumferential surface with a helical groove corresponding to the helical groove of said piston, said worm being disposed substantially on the same axis as a steering shaft, a multiplicity of balls disposed between the helical groove of said piston and the helical groove of said worm and arranged by a transfer tube mounted in the piston so as to be circulated in the helical grooves, a rack formed on one portion of the exterior of said piston and having teeth formed on a reference pitch line provided by a straight line parallel to the axis of said piston, a sector having tapered teeth with an outermost peripheral termination lying in a common circle and in meshing engagement with said rack and a cross-shaft formed integrally with said sector on the axis of rotation of said sector, an improvement in the variable ratio power steering gear characterized in that said sector is provided with a central tooth having a maximum tooth number and providing a minimum amount of shift when engaging said rack in a neutral position with side teeth forming the termination of said sector on opposite sides of said central tooth and having a minimum tooth number and maximum amount of shift, the teeth of said sector disposed between the central tooth and the side teeth being so formed as to result in gradual decrease in tooth number from said maximum number of said central teeth to said minimum number to provide a decrease in the amount of shift from a minimum amount to a maximum amount as said sector is moved in either direction from the neutral position respectively toward the positions in which one of the side teeth will engage the rack.

2. A variable ratio power steering gear according to claim 1, wherein all of the teeth of said rack are provided with tooth profiles having equal pressure angles.

3. A variable ratio power steering gear according to claim 1, wherein said rack comprises teeth having tooth profiles which are so formed that the pressure angles of the teeth to mesh with the side teeth at the opposite ends of said sector are unequal and the rack tooth profiles on the right of the center tooth of said sector and the rack tooth profiles on the left of said center tooth are symmetrical with respect to said center tooth.

References Cited

UNITED STATES PATENTS

| | | | |
|---|---|---|---|
| 2,953,932 | 9/1960 | Lincoln | 74—499 X |
| 2,964,967 | 12/1960 | Osborne | 74—498 |
| 3,064,491 | 11/1962 | Bishop | 74—498 X |
| 3,267,763 | 8/1966 | Merritt | 74—498 X |

MILTON KAUFMAN, Primary Examiner

U.S. Cl. X.R.

74—422, 437